United States Patent
Hashimoto et al.

(10) Patent No.: US 6,975,249 B2
(45) Date of Patent: Dec. 13, 2005

(54) ROTARY ELECTRONIC COMPONENT AND METHOD OF MANUFACTURING SAME

(75) Inventors: Yukio Hashimoto, Aida-gun (JP); Seiki Miura, Tsuyama (JP); Kenji Kataoka, Tsuyama (JP); Jun Sato, Tsuyama (JP)

(73) Assignee: Matsushita Electric Industrial Co., Ltd. (JP)

( * ) Notice: Subject to any disclaimer, the term of this patent is extended or adjusted under 35 U.S.C. 154(b) by 128 days.

(21) Appl. No.: 10/706,280

(22) Filed: Nov. 13, 2003

(65) Prior Publication Data

US 2004/0164878 A1 Aug. 26, 2004

(30) Foreign Application Priority Data

Nov. 27, 2002 (JP) ........................ 2002-343597

(51) Int. Cl.[7] ................................. H03M 1/22
(52) U.S. Cl. ............................... 341/16; 200/28
(58) Field of Search ........................ 341/16; 200/4, 200/11, 28

(56) References Cited

U.S. PATENT DOCUMENTS 6,198,057 B1 * 3/2001 Sato et al. ............... 200/19.18

FOREIGN PATENT DOCUMENTS

JP 11-176287 7/1999
JP 2001-216858 8/2001

* cited by examiner

Primary Examiner—Peguy Jean JeanPierre
Assistant Examiner—Joseph Lauture
(74) Attorney, Agent, or Firm—Steptoe & Johnson LLP (57) ABSTRACT

Rotary electronic component of the invention has a contact board and an elastic contact. The contact board, including an annular contact having an arc-segmental portion split by a slit with a predetermined width and signaling contacts disposed at spaced positions and in electrical continuation with the arc-segmental portion, is fixed in a resin molding with the annular contact exposed on the top plane of the resin molding. The elastic contact slides on the contact board along the annular contact. In this rotary electronic component, a stress occurring when the annular contact is fixed by molding on to the contact board is relaxed owing to presence of the slit. Thus, a rotary electronic component generating an electric signal with a stabilized waveform over a long time can be obtained.

8 Claims, 7 Drawing Sheets

ROTARY ELECTRONIC COMPONENT AND METHOD OF MANUFACTURING SAME

TECHNICAL FIELD

The present invention relates to a rotary electronic component of comparatively large-bore having a metallic annular contact fixed by molding on to a contact board made of a resin and a method of manufacturing the same.

BACKGROUND ART

Figure 8:
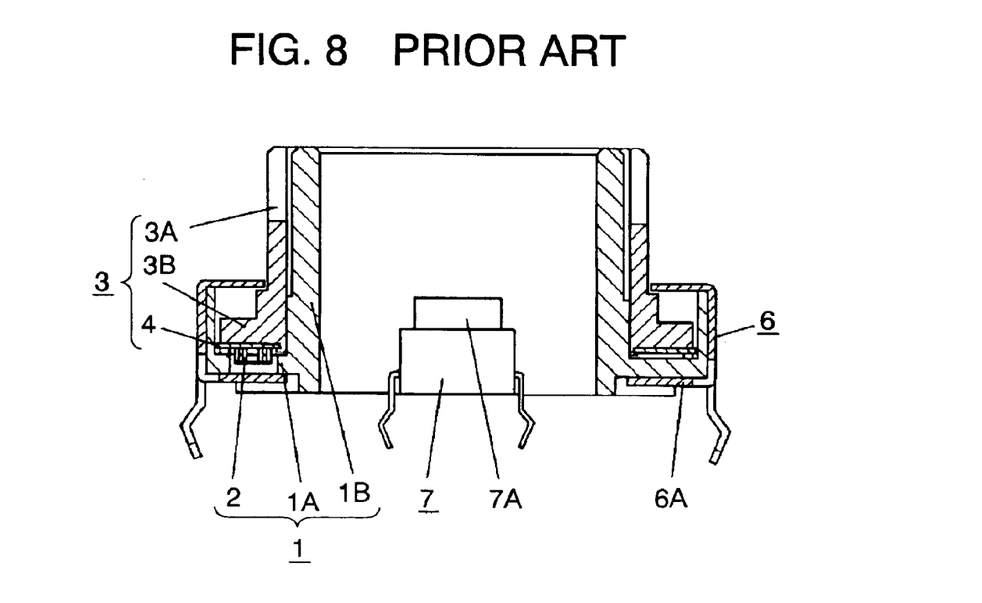
FIG. 8 is a front sectional view of a rotary encoder as a conventional rotary electronic component.
Figure 9:
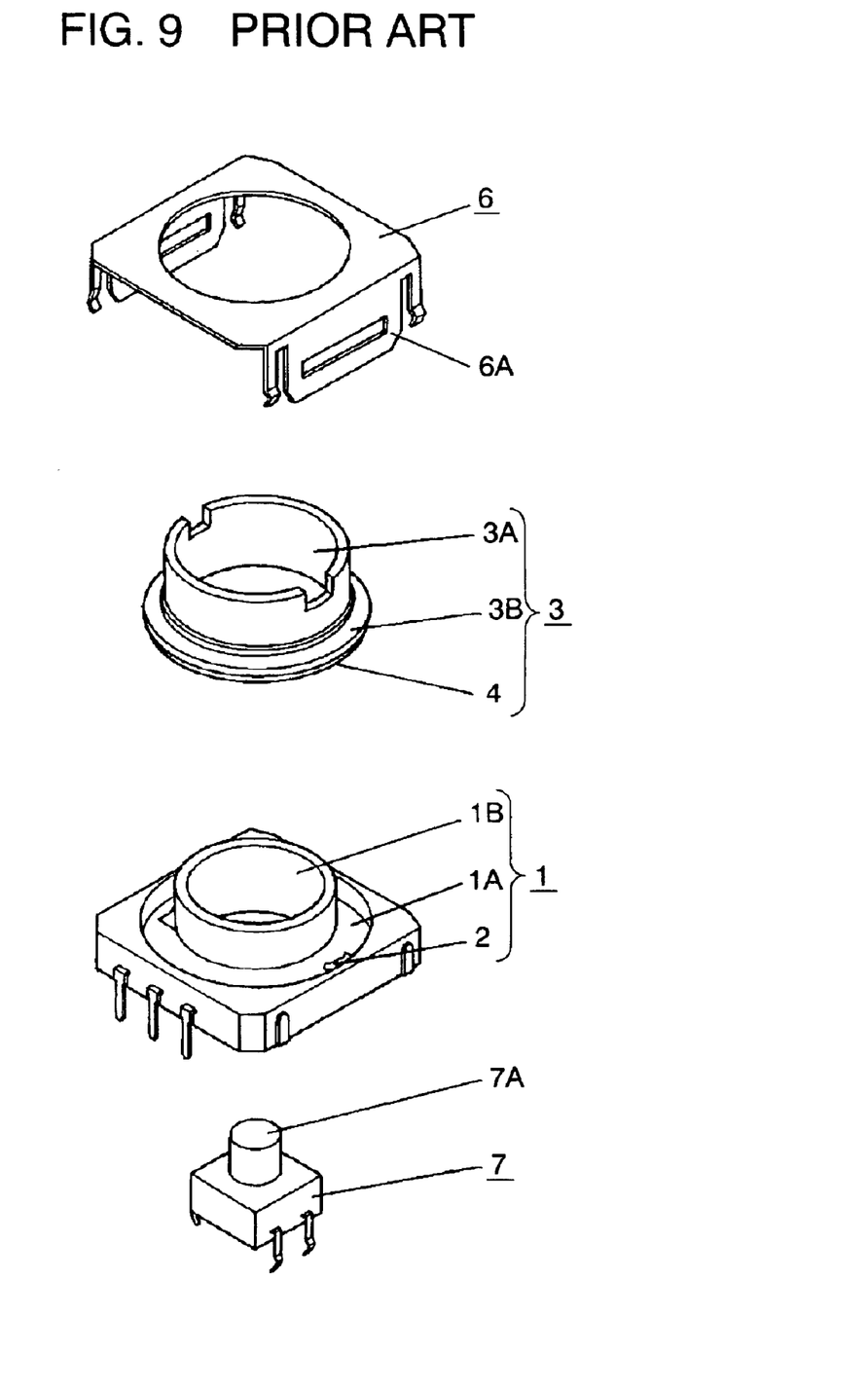
FIG. 9 shows exploded views in perspective of the conventional rotary encoder.
Figure 10:
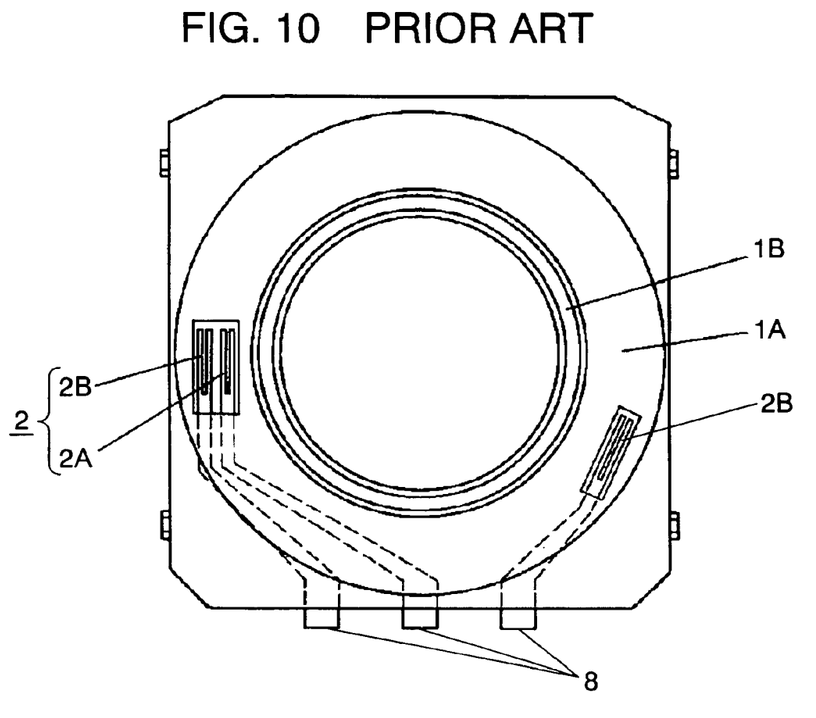
FIG. 10 is a plan view of a stationary substrate as a key part of the conventional rotary encoder.
Figure 11:
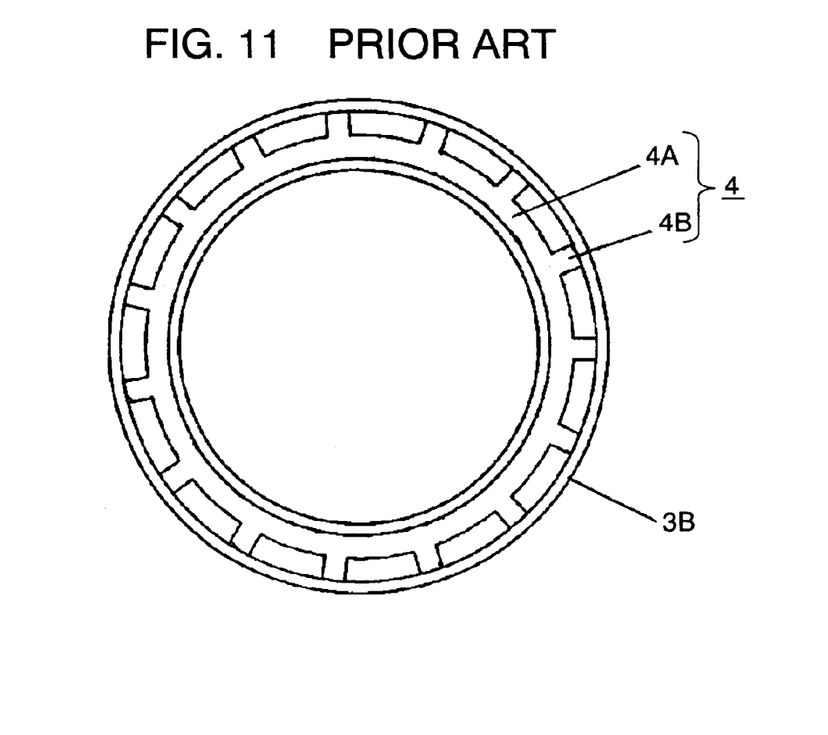
FIG. 11 is a bottom view of a contact board portion as a key part of the conventional rotary encoder.

A conventional rotary electronic component will be described below with reference to FIG. 8 through FIG. 13. FIG. 8 is a front view of a rotary encoder as an example of a conventional rotary electronic component. FIG. 9 is an exploded view in perspective of the same, FIG. 10 is a plan view of a stationary substrate, and FIG. 11 is a bottom view of a contact board portion of a rotatable member.

Stationary substrate (hereinafter referred to as substrate) 1 made of a resin is provided, at a flat plane portion 1A thereof, with a plurality of elastic contacts (hereinafter referred to as contacts) 2 made of an elastic sheet metal, each contact constituting a contacting portion as a stationary contact. There is provided, rotatably fitted over the outer periphery of hollow cylindrical wall 1B disposed in the center, cylindrical shaft 3A of rotatable member 3 made of an insulating resin. In the circumference of rotatable member 3, there is provided flange-shaped contact board portion (hereinafter referred to as board portion) 3B. On to the underside of board portion 3B, there is fixed, by insert-molding, metallic annular contact (hereinafter referred to as contact) 4. Contact 4 serves as a movable contact. Further, leg portion 6A of cover 6 covering over the top face of board portion 3B is bent at its end so that each contact 2 on substrate 1 is adopted to make contact with contact 4. By virtue of the described configuration, rotatable member 3 in its entirety is positioned with respect to substrate 1.

Figure 12:
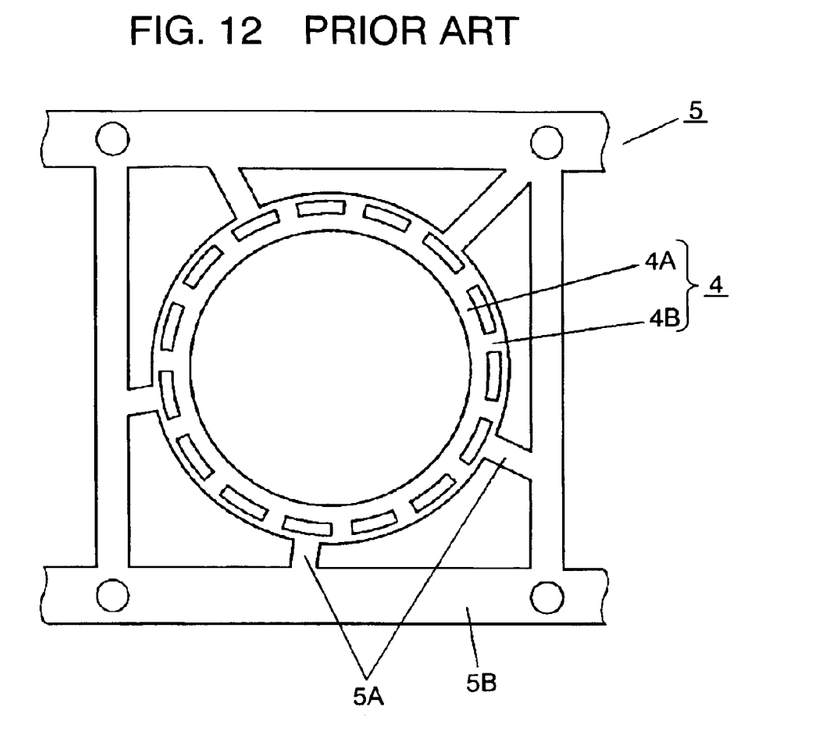
FIG. 12 is a plan view showing a state of a metallic contact plate before being assembled into the conventional rotary encoder.

FIG. 12 is a plan view showing a state of a metallic contact plate before being subjected to assembly work. As shown in FIG. 12, contact 4 has predetermined signaling contact portions (hereinafter referred to as contact portions) 4B disposed at spaced positions in electrical continuation with ring portion 4A, which is continuous all around its circumference. Before being subjected to assembling work, contact 4 is fixed to frame portion 5B by connection supports 5A, which collectively form metallic contact plate 5. When rotatable member 3 is subjected to molding work, metallic contact plate 5 is fixed on to board portion 3B by insert-molded with an insulating resin. Thereafter, connection supports 5A are cut off and thereby board portion 3B is formed in the circumference of rotatable member 3.

Figure 13:
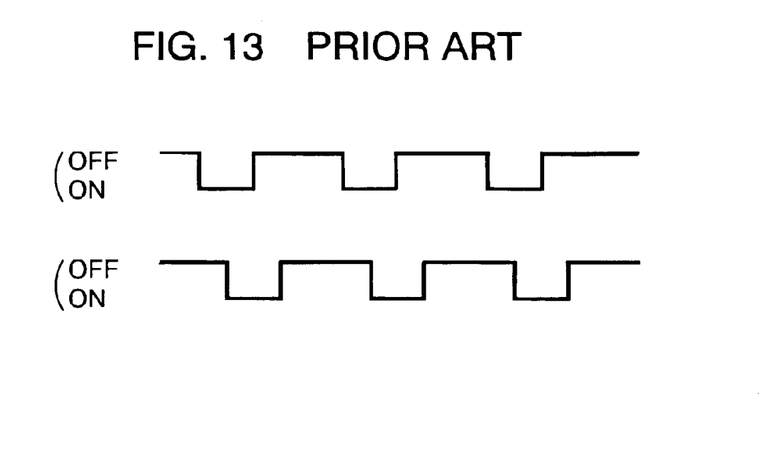
FIG. 13 is an output waveform diagram of the conventional rotary encoder.

By rotating rotatable member 3 by way of cylindrical shaft 3A, contacting portions 2A and 2B of contact 2 are allowed to slide on ring portion 4A and contact portion 4B of contact 4, respectively. Thereby, electric signals repeating OFF-ON state in accordance with a predetermined rule as shown in FIG. 13 are generated and the signals are output to a circuit of an electronic apparatus used, through a predetermined outputs 8.

Further, as shown in FIG. 8, the conventional rotary electronic component has push switch 7 in the center of cylindrical wall 1B on substrate 1. By pushing this push button 7A, push switch 7 can be actuated independently of the above described rotary encoder portion.

Such a rotary electronic component is disclosed for example in Japanese Patent Non-examined Publication No. H11-176287.

Rotary electronic components of the described type are given a relatively large bore such that another independent electronic component such as push switch 7 is accommodated therein as noted above. For use in an electronic apparatus, it is required that the generated electronic signal be stable for a long time. To meet such requirement, it is necessary that the contact portions responsible for generating the electric signal be formed to be stable.

However, in a conventional rotary encoder as a conventional rotary electronic component, as noted above, contact 4 as movable contact is formed by insert-molding metallic contact plate 5, with an insulating resin, so as to be fixed on to rotatable member 3. Therefore, when board portion 3B of a large-bored rotatable member 3 is processed by such molding, a considerably great amount of shrinkage occurs in the insulating resin while it is cooled and hardened. On the other hand, metallic contact plate 5 insert-molded and fixed on to board portion 3B scarcely shrinks under the changes in temperature. Further, contact 4 has circular ring portion 4A continuous around the entire circumference, it hardly deforms. Therefore, a stress due to shrinkage of the insulating resin is induced at board portion 3B. In the extreme, contact 4 will partly rise or board portion 3B will warp. Hence, fluctuations of the electric signal may sometimes be caused during the use for a long time.

DISCLOSURE OF THE INVENTION

The rotary electronic component of the present invention has a contact board portion and an elastic contact. The contact board portion has a metallic annular contact, which includes an arc-segmental portion split by a slit and a signaling contact portion electrically continuous with the arc-segmental portion, fixed thereon by resin-molding, with the metallic annular contact exposed on the plane of the resin molding. The elastic contact slide on the contact board along the annular contact.

DETAILED DESCRIPTION OF PREFERRED EMBODIMENT

Figure 1:
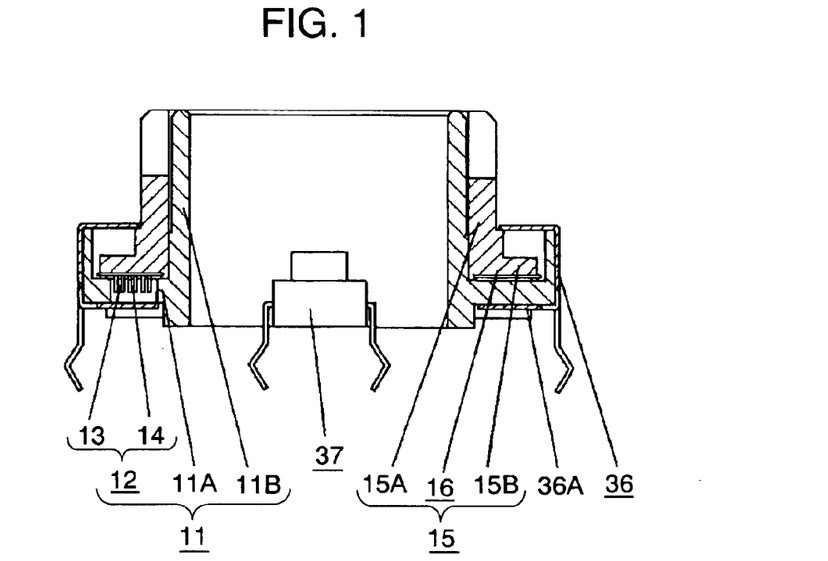
FIG. 1 is a front sectional view of a rotary encoder as a rotary electronic component according to an embodiment of the present invention.
Figure 2:
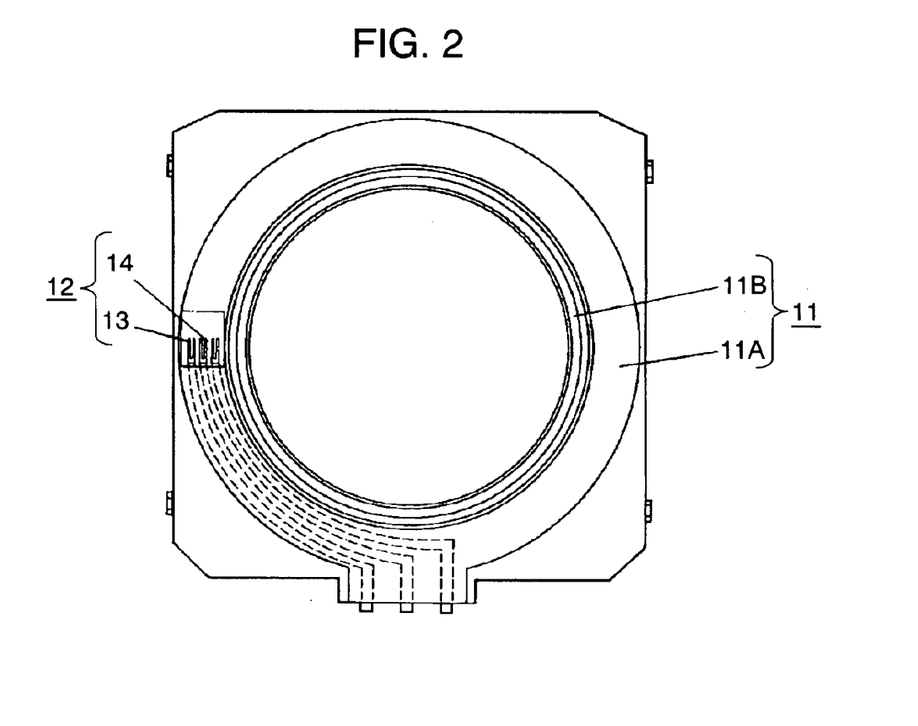
FIG. 2 is a plan view of a stationary substrate as a key part of the rotary encoder of FIG. 1.

FIG. 1 is a front sectional view of a rotary encoder as a rotary electronic component according to an embodiment of the present invention. FIG. 2 is a plan view of a stationary substrate.

Figure 3:
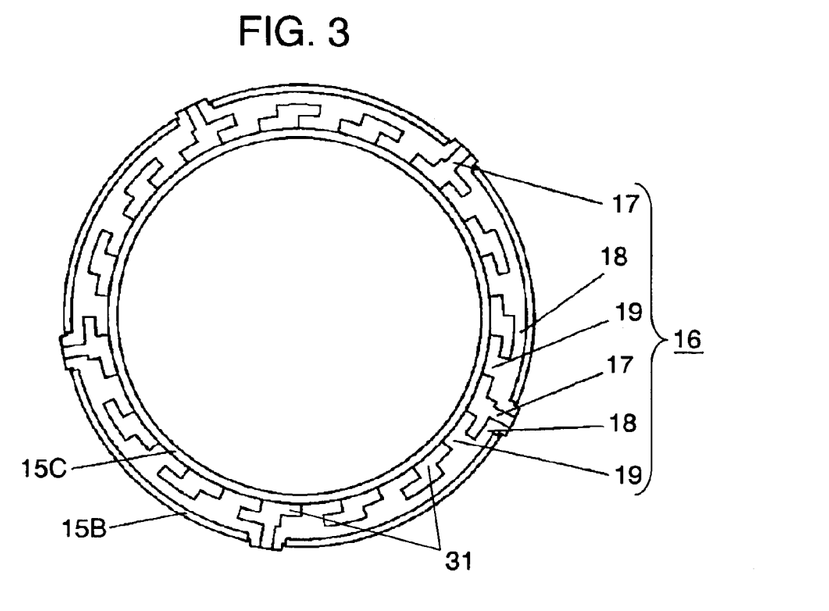
FIG. 3 is a bottom view of a contact board portion as a key part of the rotary encoder of FIG. 1.

Stationary substrate (hereinafter referred to as substrate) 11 made of an insulating resin has, on flat plane portion 11A thereof, a plurality of elastic contacts (hereinafter referred to as contacts) 12, as stationary contacts, made of elastic sheet metal. There is provided cylindrical shaft 15A of rotatable member 15, made of an insulating resin, rotatably fitted over the outer periphery of hollow cylindrical wall 11B disposed in the center. At the circumferential portion of rotatable member 15, there is provided contact board portion (hereinafter referred to as board portion) 15B in a flange shape. Fixed on to the underside of board portion 15B by insert-molding, there is disposed, as shown in FIG. 3, metallic annular contact (hereinafter referred to as contact) 16, as a movable contact. Further, leg portion 36A of cover 36 covering over the top surface of board portion 15B is bent at its end portion so that each contact 12 is adopted to make contact with contact 16. By virtue of the described configuration, the whole of rotatable member 15 is positioned with respect to substrate 11.

By rotating rotatable member 15 by way of cylindrical shaft 15A, each contacting portion 13, 14 of contact 12 shown in FIG. 2 is allowed to slide on the contact 16, whereby an electric signal in accordance with a predetermined rule is generated.

There is provided push switch 37 in the center of cylindrical wall 11B on substrate 11 so as to be actuated independently of the above described rotary encoder portion.

The rotary electronic component according to the present embodiment, as described above, has a structure similar to that of conventional one. However, when FIG. 3 is compared with FIG. 11, the structure of contact 16 fixed by insert molding on to the underside of board portion 15B is different from that of conventional contact 4.

More specifically, contact 16 is made up of an arc-segmental portions 18 split by narrow slit 17 into a plurality of pieces and signaling contact portions 19 disposed at spaced positions and in electrical continuation with their respective pieces of arc-segmental portion 18. Each piece of arc-segmental portion 18 is arranged in a ring-shape, via each slit 17, so as to be within the same width of a circular ring.

Figure 4:
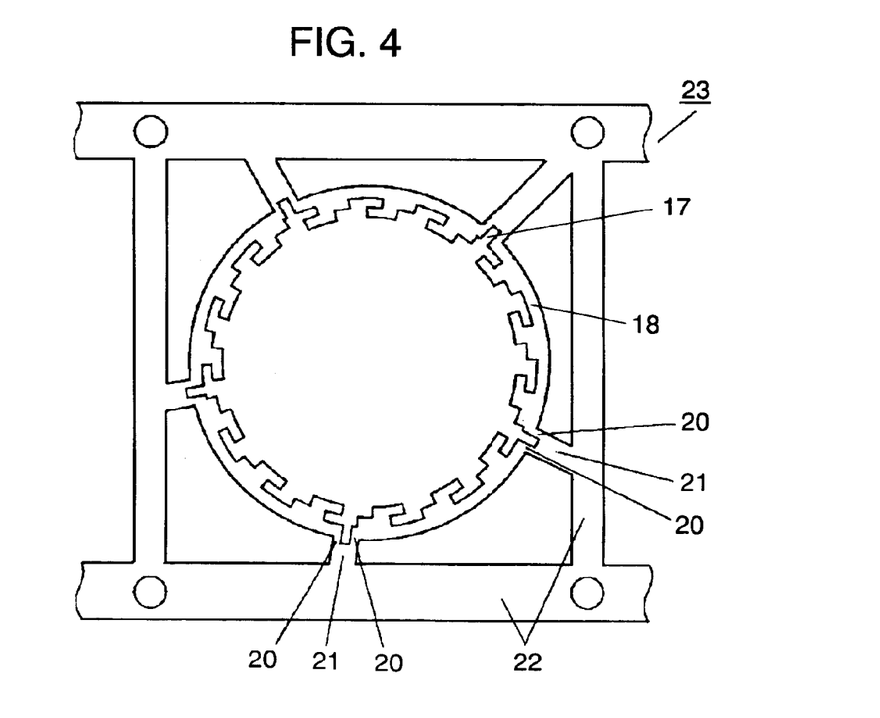
FIG. 4 is a plan view showing a state of a metallic contact plate before being assembled into the rotary encoder of FIG. 1.

A method of manufacturing board portion 15B having contact 16 fixed thereto will be described below. FIG. 4 shows a state of metallic contact plate (hereinafter referred to as contact plate) 23 before being subjected to assembling work. Contact plate 23 includes a portion forming contact 16, connection supports 21, and surrounding frame portion 22. Each of connection supports 21 has projected portions 20 extended outwardly from both sides of slit 17, whereby arc-segmental portion 18 is split. And the projected portions 20 are joined together at the tip thereof. Further, connection supports 21 are fixed to surrounding frame portion 22.

Figure 5:
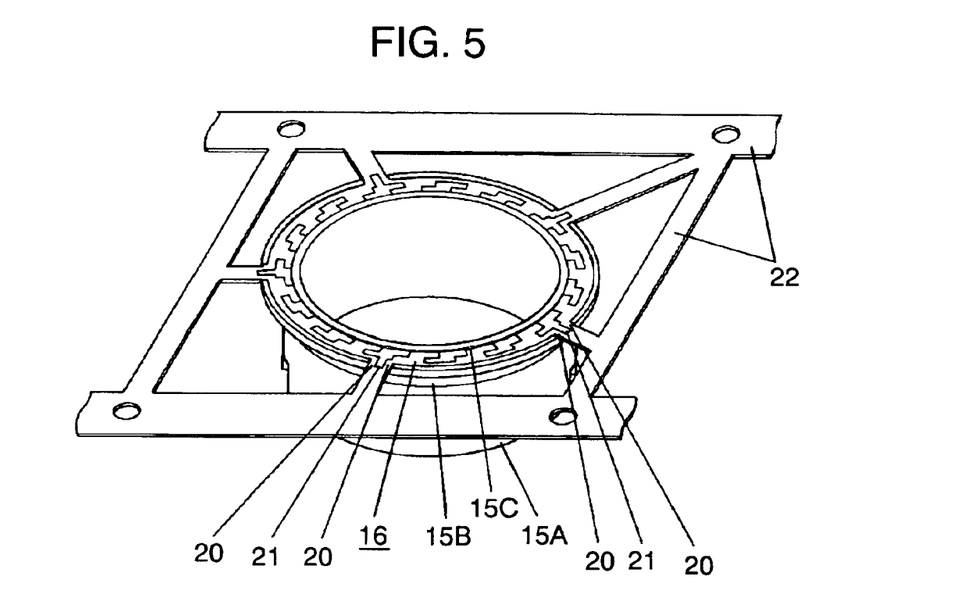
FIG. 5 is an external view in perspective, seen obliquely from the bottom side, of a rotatable member gone through molding and to be assembled into the rotary encoder of FIG. 1.

When rotatable member 15 is subjected to molding work, the portion forming contact 16 of contact plate 23 is kept bare, or exposed, on the top plane of the resin molding as shown in FIG. 5. Thus, the portion, inclusive of projected portions 20, is fixed on to the underside of board portion 15B by insert-molding. Thereafter, each projected portion 20 is cut at its base portion, whereby each projected portion 20 is separated from each connection support 21 connected thereto.

In the present embodiment, as described above, contact 16 is arranged in a ring shape, with its arc-segmental portion 18 split by narrow slit 17. By virtue of the configuration, when contact plate 23 is fixed on to the underside of board portion 15B by insert-molding, contact 16 produces small displacements at its portion of slit 17 in compliance with shrinkage of the resin at this time, whereby the stress due to the shrinkage of the resin during the time of molding is relaxed. Accordingly, the entire body of contact 16 is fixed in a stable state on the underside of board portion 15B. Thus, it is made possible to obtain a rotary electronic component capable of stably generating for a long time an electric signal in accordance with a predetermined rule throughout the sliding range of contact 12.

Further, in the present embodiment, board portion 15B is formed, after contact plate 23 has been fixedly insert-molded, by cutting it off at the joined portions of projected portions 20. Therefore, a rotary electronic component in which contact 16, provided by having arc-segmental portion 18 split by slit 17, is fixed on to contact board 15B stably in shape and size can be obtained.

Figure 6:
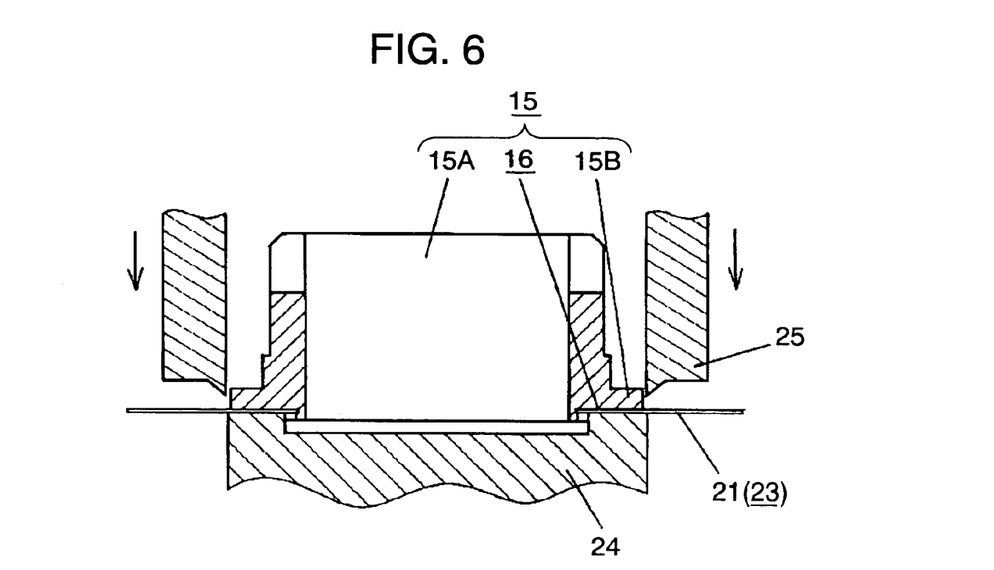
FIG. 6 is a front sectional view explanatory of a method of cutting projected portions off the metallic contact plate to be assembled into the rotary encoder of FIG. 1.

In cutting off of connection supports 21, rotatable member 15 gone through molding is placed with its side of contact 16 turned down as shown in FIG. 6. Then, bottom piece 24 of a cutting die is pressed against the surface of projected portions 20 projecting from arc-segmental portion 18, while top piece 25 of the cutting die is pressed down from above and outwardly of rotatable member 15. At this time, when contact plate 23 is insert-molded to be fixed on to the underside of board portion 15B, it is desired that the surface of the base portions of projected portions 20 be kept from being covered by the resin as shown in FIG. 5. Thereby, the base portions of projected portions 20 can be cut simply and certainly.

Further, as shown in FIG. 3 and FIG. 5, when contact plate 23 is fixed on to the underside of board portion 15B by molding, it is desired that the inner-peripheral end faces of signaling contact portions 19 be covered with resin layer 15C in an annular shape parallel to arc-segmental portion 18. Thereby, contact 16 can be fixed on to board portion 15B more stably and firmly. Namely, a rotary electronic component in which contact 16 is fixed on to contact board portion 15B more stably and firmly can be obtained.

Contact 12 is disposed on substrate 11 to be adopted to make contact with contact 16 on board portion 15B formed as described above. Contact 12 has at least two contacting portions 13 and 14 as shown in FIG. 2. Contacting portions 13, 14 are disposed on a straight line along a radius from the center of cylindrical wall 11B on substrate 11, i.e., the center of rotation of rotatable member 15. It is arranged such that contacting portion 13 slides along arc-segmental portion 18 of contact 16, while contacting portion 14 slides along signaling contact portions 19.

Suppose now that the rotary encoder of the present embodiment is of a general type repeating ON-OFF cycles at a predetermined frequency. In the present embodiment, as shown in FIG. 3, there are provided thin slits 17 at arc-segmental portion 18 of contact 16 and each slit 17 is disposed within the range of insulating portion 31 between signaling contact portions 19 in electrical continuation with respective pieces of arc-segmental portion 18. Therefore, when rotatable member 15 is rotated, the interval at which contacting portion 13 slides on the portion of slit 17 of arc-segmental portion 18 of contact 16 comes to be included into an OFF state of the electric signal. Thus, in a state where contacting portion 14 is insulated from signaling contact portions 19, contacting portion 13 comes into contact with slit 17. More specifically, in spite of the arc-segmental portion 18 of contact 16 being separated at portions of slit 17, an electric signal repeating ON-OFF states at a predetermined frequency can be generated throughout the sliding range of contact 12 along contact 16. Contact 12 may be of a general structure as described above.

Incidentally, when two independent contacting portions are provided as contacting portion 14 with a phase difference therebetween, electric signals as shown in FIG. 13 described in the conventional art will be obtained.

Figure 7:
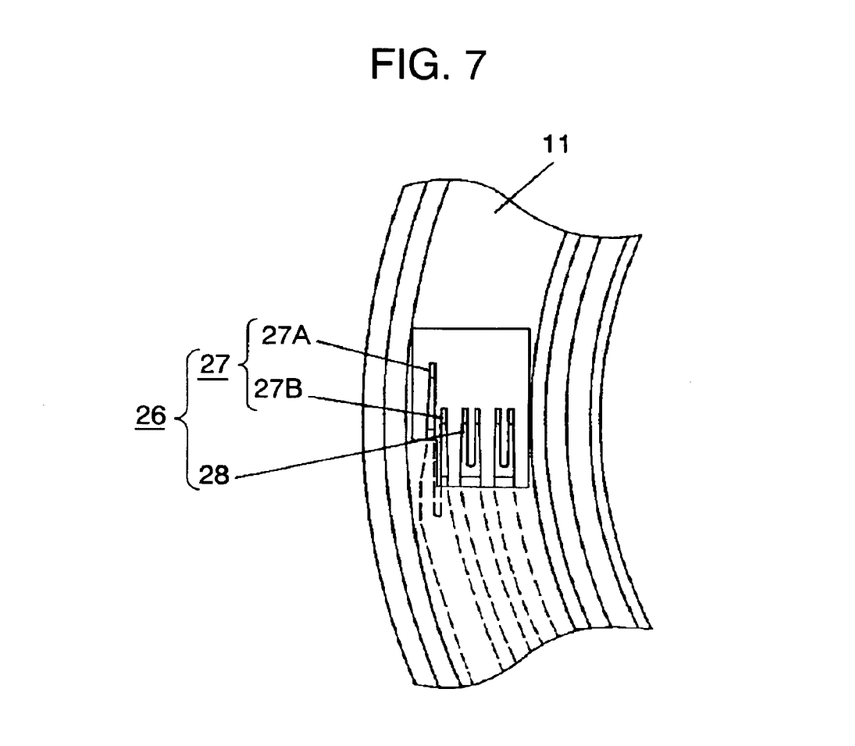
FIG. 7 is an enlarged, partial plan view of a stationary substrate for a rotary encoder, as a rotary electronic component according to the embodiment of the present invention, provided with an elastic contact of another configuration.

Further, instead of contact 12, elastic contact (hereinafter referred to as contact) 26 having two contacting portions 27 and 28 may be provided as shown in FIG. 7. In contact 26, contacting portion 27 coming into contact with arc-segmental portions 18 has two contacting points 27A and 27B. Here, contacting points 27A and 27B are in electrical continuation with each other at a pitch interval not smaller than slit 17 splitting arc-segmental portion 18 of contact 16 in the sliding direction while rotatable member 15 is rotated. By virtue of such a configuration, at least one of contact points 27A and 27B is at all times on a piece of arc-segmental portion 18 regardless of arc-segmental portion 18 being separated by the portions of slit 17. Thus, the rotary electronic component as described above is enabled to generate an electric signal in accordance with a predetermined rule throughout the sliding range of contact 26 along contact 16.

Although such an arrangement that has contact 12 disposed on substrate 11 and contact 16 and 26 disposed on board portion 15B has been described above, their combinations may be made the other way round.

Further, though contact 12 is formed of an elastic sheet metal, it need not necessarily be so. For example, such a configuration may be made that has a roller type contact sliding on contact 16 and a spring pressing the roller against contact 16.

In the rotary electronic component according to the present invention, the metallic annular contact is provided by having arc-segmental portion split by a slit. Therefore, when the metallic annular contact is insert-molded to be fixed on to the contact board portion, the metallic annular contact produces small deformations at the slit portions in compliance with the shrinkage of the resin at this time, whereby a stress due to the shrinkage at the time of molding is relaxed. Thereby, contact portions on the contact board portion are formed in a stable manner, and the rotary electronic component is enabled to generate an electric signal in accordance with a predetermined rule throughout the sliding range of elastic contact stably for a long time.

What is claim is:

1. A rotary electronic component comprising:
    a metallic annular contact including an arc-segmental portion split by a slit and a signaling contact portion electrically continuous with said arc-segmental portion;
    a contact board portion having said annular contact fixed thereto by resin molding such that said annular contact is exposed on a top plane thereof; and
    an elastic contact for sliding on said contact board portion along said annular contact.

2. The rotary electronic component according to claim 1, wherein
    said signaling contact portion is disposed on an inner side of said arc-segmental portion, and wherein said rotary electronic component further comprises a resin layer disposed parallel to said arc-segmental portion for covering an inner peripheral face of said annular contact.

3. The rotary electronic component according to claim 1, wherein
    said component repeats ON-OFF states at a predetermined frequency following sliding movement of said elastic contact, and wherein an interval at which said elastic contact slides on said slit of said arc-segmental portion is included in an OFF state of an electric signal.

4. The rotary electronic component according to claim 1, wherein
    said rotary electronic component has a plurality of said elastic contacts, of which a first elastic contact slides on said arc-segmental portion and a second elastic contact slides on said signaling contact portion, and wherein said first elastic contact comes into contact with said slit when said second elastic contact is insulated from said signaling contact portion.

5. The rotary electronic component according to claim 1, wherein
    said elastic contact has a plurality of contacting points electrically continuous with each other and disposed at a pitch distance as long as at least the width of said slit.

6. The rotary electronic component according to claim 1, wherein
    said rotary electronic component generates an electric signal in accordance with a predetermined rule throughout an entire sliding range of said elastic contact for sliding on said annular contact including portions of said slit of said arc-segmental portion.

7. A method of manufacturing a rotary electronic component comprising:
    (A) insert-molding, with a resin metallic, contact plate having (1) an annular contact, including an arc-segmental portion split by a slit and a signaling contact portion in electrical continuation with said arc-segmental portion and (2) a projected portion in such a shape as led out from both sides of said slit and joined together at their ends, such that said metallic contact plate including said projected portion is fixed in the resin molding with said annular contact exposed on a top plane of the resin; and
    (B) cutting off said projected portion at the joined portion thereby forming a contact board portion.

8. The method of manufacturing a rotary electronic component according to claim 7, wherein, in step (A), a surface of a base end portion of said projected portion is kept from being covered by the resin.

* * * * *

UNITED STATES PATENT AND TRADEMARK OFFICE
CERTIFICATE OF CORRECTION

PATENT NO.    : 6,975,249 B2
DATED         : December 13, 2005
INVENTOR(S)   : Yukio Hashimoto et al.

It is certified that error appears in the above-identified patent and that said Letters Patent is hereby corrected as shown below:

Column 5,
Line 61, replace "What is claim is:" with -- What is claimed is: --.

Column 6,
Lines 47-48, change "resin metallic, contact plate having (1) an annular contact, including" to read -- resin, a metallic contact plate having (1) an annular contact including --;
Lines 55-56, change "fixed in the resin molding" to read -- fixed in the resin --.

Signed and Sealed this

Sixteenth Day of May, 2006

JON W. DUDAS
*Director of the United States Patent and Trademark Office*